United States Patent [19]
Thusoo et al.

[11] Patent Number: 5,632,028
[45] Date of Patent: May 20, 1997

[54] HARDWARE SUPPORT FOR FAST SOFTWARE EMULATION OF UNIMPLEMENTED INSTRUCTIONS

[75] Inventors: Shalesh Thusoo, Milpitas; Farnad Sajjadian, Sunnyvale; Jaspal Kohli, Sunnyvale; Niteen A. Patkar, Sunnyvale, all of Calif.

[73] Assignee: HaL Computer Systems, Inc., Campbell, Calif.

[21] Appl. No.: 397,911

[22] Filed: Mar. 3, 1995

[51] Int. Cl.$^6$ .................................................. G06F 3/00
[52] U.S. Cl. ............................ 395/500; 395/800; 395/568
[58] Field of Search ................................ 395/500, 700, 395/800, 375, 182.03, 182.08; 364/578, DIG. 1, DIG. 2

[56] References Cited

U.S. PATENT DOCUMENTS

| | | | |
|---|---|---|---|
| 3,955,180 | 5/1976 | Hirtle | 395/500 |
| 4,306,286 | 12/1981 | Cocke et al. | 395/800 |
| 4,514,803 | 4/1985 | Agnew et al. | 395/500 |
| 4,656,580 | 4/1987 | Hitchcock, Sr. et al. | 395/500 |
| 4,715,035 | 12/1987 | Boehner | 364/578 |
| 4,763,242 | 8/1988 | Lee et al. | 395/500 |
| 4,862,347 | 8/1989 | Rudy | 364/DIG. 1 |
| 5,077,657 | 12/1991 | Cooper et al. | 395/500 |
| 5,117,487 | 5/1992 | Nagata | 395/800 |
| 5,119,499 | 6/1992 | Tonomura et al. | 395/800 |
| 5,165,026 | 11/1992 | Kusakabe | 395/375 |
| 5,210,832 | 5/1993 | Maier et al. | 395/375 |
| 5,212,693 | 5/1993 | Chao et al. | 395/182.03 |
| 5,287,490 | 2/1994 | Sites | 395/500 |
| 5,381,547 | 1/1995 | Flug et al. | 395/700 |
| 5,406,644 | 4/1995 | MacGregor | 395/500 |
| 5,481,684 | 1/1996 | Richter et al. | 395/500 |
| 5,481,693 | 1/1996 | Blomgren et al. | 395/500 |
| 5,481,751 | 1/1996 | Alpert et al. | 395/375 |

*Primary Examiner*—Kevin J. Teska
*Assistant Examiner*—Jacques Louis-Jacques
*Attorney, Agent, or Firm*—Leo V. Novakoski; Mark C. Terrano

[57] ABSTRACT

A system and method provides hardware support for fast software emulation of unimplemented instructions using issue trap logic that determines the instruction type and parameter fields of an unimplemented instruction when an exception is triggered and uses the fields to branch directly to emulation code specific to an unimplemented instruction having the determined instruction type and parameter fields.

6 Claims, 5 Drawing Sheets

HARDWARE SUPPORT FOR FAST SOFTWARE EMULATION OF UNIMPLEMENTED INSTRUCTIONS

RELATED APPLICATIONS

The subject matter of this application is related to the subject matter of the following applications:

application Ser. No. 08/388,602 entitled "INSTRUCTION FLOW CONTROL CIRCUIT FOR SUPERSCALER MICROPROCESSOR" filed on Feb. 14, 1995 by Takeshi Kitahara;

application Ser. No. 08/388,389 entitled "ADDRESSING METHOD FOR EXECUTING LOAD INSTRUCTIONS OUT OF ORDER WITH RESPECT TO STORE INSTRUCTIONS" filed on Feb. 14, 1995 by Michael A. Simone and Michael C. Shebanow;

application Ser. No. 08/388,606 entitled "METHOD AND APPARATUS FOR EFFICIENTLY WRITING RESULTS TO RENAMED REGISTERS" filed on Feb. 14, 1995 by DeForest W. Tovey, Michael C. Shebanow and John Gmuender;

application Ser. No. 08/388,364 entitled "METHOD AND APPARATUS FOR COORDINATING THE USE OF PHYSICAL REGISTERS IN A MICROPROCESSOR" filed on Feb. 14, 1995 by DeForest W. Tovey, Michael C. Shebanow and John Gmuender;

application Ser. No. 08/390,885 entitled "PROCESSOR STRUCTURE AND METHOD FOR TRACKING INSTRUCTION STATUS TO MAINTAIN PRECISE STATE" filed on Feb. 14, 1995 by Gene W. Shen, John Szeto, Niteen A. Patkar and Michael C. Shebanow;

application Ser. No. 08/397,893 entitled "RECLAMATION OF PROCESSOR RESOURCES IN A DATA PROCESSOR" filed on Mar. 3, 1995 by Michael C. Shebanow, Gene W. Shen, Ravi Swami, Niteen Patkar;

application Ser. No. 08/397,891 entitled "METHOD AND APPARATUS FOR SELECTING INSTRUCTIONS FROM ONES READY TO EXECUTE" filed on Mar. 3, 1995 by Michael C. Shebanow, John Gmuender, Michael A. Simone, John R. F. S. Szeto, Takumi Maruyama and DeForest W. Tovey;

application Ser. No. 08/398,284 entitled "METHOD AND APPARATUS FOR ACCELERATING CONTROL TRANSFER RETURNS" filed on Mar. 3, 1995 by Akiro Katsuno, Sunil Savkar and Michael C. Shebanow;

application Ser. No. 08/398,066 entitled "METHODS FOR UPDATING FETCH PROGRAM COUNTER" filed on Mar. 3, 1995 by Akira Katsuno, Niteen A. Patkar, Sunil Savkar and Michael C. Shebanow;

application Ser. No. 08/398,151 entitled "METHOD AND APPARATUS FOR RAPID EXECUTION OF CONTROL TRANSFER INSTRUCTIONS" filed on Mar. 3, 1995 by Sunil Savkar;

application Ser. No. 08/397,910 entitled "METHOD AND APPARATUS FOR PRIORITIZING AND HANDLING ERRORS IN A COMPUTER SYSTEM" filed on Mar. 3, 1995 by Chih-Wei David Chang, Joel Fredrick Boney and Jaspal Kohli;

application Ser. No. 08/397,800 entitled "METHOD AND APPARATUS FOR GENERATING A ZERO BIT STATUS FLAG IN A MICROPROCESSOR" filed on Mar. 3, 1995 by Michael Simone; and application Ser. No. 08/397,912 entitled "ECC PROTECTED MEMORY ORGANIZATION WITH PIPELINED READ-MODIFY-WRITE ACCESS" filed on Mar. 3, 1995 by Chien Chen and Yizhi Lu;

each of the above applications having the same assignee as the present invention, and each incorporated herein by reference in their entirety.

BACKGROUND OF THE INVENTION

1. Technical Field

This invention relates to methods and systems for handling exceptions in computer systems, and, in particular, to methods and systems for handling exceptions triggered by unimplemented instructions using a combination of hardware and software.

2. Related Art

It is not always possible or desirable to implement in hardware all of the instructions defined in the specification of a particular microprocessor architecture. For example, some instructions may be included in a specification to support software written for earlier versions of the microprocessor. Including hardware to implement these instructions can have a substantial impact on the critical path of the processor, and when these instructions are used only infrequently, the efficiency cost of including the necessary hardware may not be justified. In such situations, designers often use supervisory software to retrieve, interpret, and emulate the unimplemented instructions.

Conventional methods for software emulation of unimplemented instructions employ trap vectors to transfer control of program flow from the processor to a software routine or emulation code in the supervisory software. Instructions are specified by various bit fields in a corresponding instruction code. Typically, all unimplemented instructions having the same instruction type field are processed by a single trap vector, independent of the instruction parameters specified in the remaining bit fields (parameter fields) of the instruction code. For example, all unimplemented load instructions use the same trap vector to access emulation code, independent of the source and destination registers specified by the instruction. These parameters are obtained by the emulation software pointed to by the trap vector. Thus, the emulation code must include transfer control functions such as a branch table to access the unimplemented instruction in memory, as well as routines to interpret the fields in the instruction code, and process the unimplemented instruction using instructions for which the processor includes implementing hardware.

The transfer control, interpretation, and processing routines included in the emulation code add a substantial number of steps to the code, and increase the time necessary to run the emulation code. For example, emulation code suitable for handling retrieving load instructions from memory, identifying the source and destination registers specified in the instruction, and processing the instruction using implemented instructions may require twenty to forty steps in assembler language, of which the actual processing routine only represents seven or eight steps. Thus, there is a need for faster software emulation processes that rely on fewer code steps to emulate unimplemented instructions.

SUMMARY OF THE INVENTION

The present invention is a system and method for software emulation of unimplemented instructions using emulation codes specific to the instruction type and parameter fields of the unimplemented instructions. For each unimplemented instruction, an emulation code specific to the instruction type and parameter fields of the corresponding instruction code is prepared and stored at a memory address related to these fields. A processor includes issue trap logic to read the information type and parameter fields when the unimplemented instruction triggers an exception. The issue trap logic then calculates the memory address of the corresponding emulation code from the read fields and transfers control directly to this emulation code. The issue trap logic also transfers selected parameter fields of the unimplemented instruction to registers in the processor, where the data is available for processing by the emulation code.

Because the issue trap logic reads the information type and parameter fields of an unimplemented instruction as part of the exception handling process, the emulation code need not contain routines for retrieving the unimplemented instruction from memory and interpreting the parameters fields from the retrieved instruction. Instead, the emulation code is tailored to parameter and instruction type fields of the corresponding unimplemented instruction and consequently runs faster. By storing the emulation codes at memory addresses related to the fields read by the issue trap logic, the logic can branch directly to the appropriate emulation when the exception is triggered.

In accordance with the present invention, the issue trap logic identifies unimplemented instructions and calculates a memory address for a trap vector in an emulation code table using an offset determined by the instruction type and parameter fields. The fields are left shifted to ensure that the trap vectors are sufficiently separated to accommodate complete emulation code sequences within the emulation code table itself. The processor branches directly to the trap vector which forms the first instruction in an emulation code sequence specific to the parameter and instruction type fields of the unimplemented instruction. The operand information necessary to process the unimplemented instruction is read from the processor register by the emulation code.

DETAILED DESCRIPTION OF THE INVENTION

Figure 1:
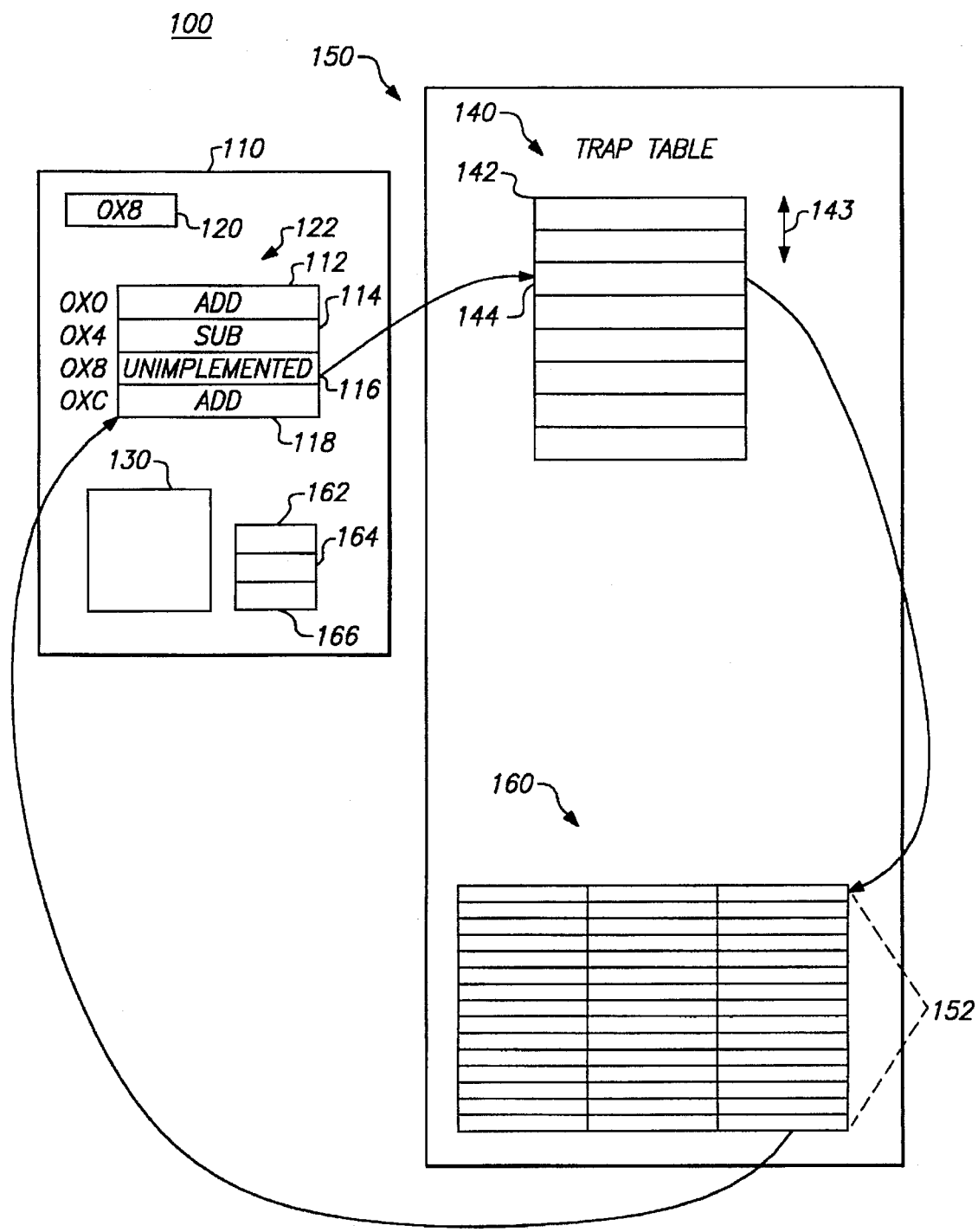
FIG. 1 is a schematic representation of a prior art method for processing unimplemented instructions.

Referring to FIG. 1, there is shown a schematic representation of a conventional system 100 for handling unimplemented instructions. System 100 comprises a processor 110 and a memory 150 coupled to processor 110. Processor 110 includes issue trap logic 130 and various processor registers 162, 164, 166 for trap handling, and memory 150 includes a trap table 140 and supervisory software 160 for trap handling. A program counter register (PC) 120 in processor 110 is shown holding an unimplemented instruction 116 from an instruction stream 122, which also includes implemented instructions 112, 114, 118, i.e. instructions for which processor 110 includes implementing logic.

A base address 142 specifies the location of trap table 140 in memory 150 and a trap vector 144 corresponding to the instruction type of unimplemented instruction 116 is at an offset 143 determined by the instruction type of unimplemented instruction 116. As shown, trap vector 144 points to an emulation code 152 in supervisor software 160. Emulation code 152 is a general emulation code suitable for all unimplemented instructions 116 of a given instruction type. Accordingly, emulation code 152 includes routines for retrieving unimplemented instruction 116 of the given instruction type, interpreting the parameter fields that fully specify unimplemented instruction 116, and emulating the fully specified unimplemented instruction 116.

In order to access emulation code 152, base address 142 is stored in processor register 162 and offset 143 is calculated by trap logic 130 from the contents of processor registers 164, 166. For example, in processors employing SPARC 64-bit architecture (V.9), register 162 is a trap base address (TBA) register 162 that holds 49-bit table base address 142. Offset 143 is determined by a one-bit trap level (TL) register 164 and a nine-bit trap type (TT) register 166 that is determined by the type of instruction causing the exception. The remainder of the 64-bit address of trap vector 144 is made up of zeroes. TBA register 162 is set by supervisor software at initialization. TL and TT registers 164, 166, respectively, are loaded by issue logic 130 when an unimplemented instruction 116 triggers an exception.

Figure 2:
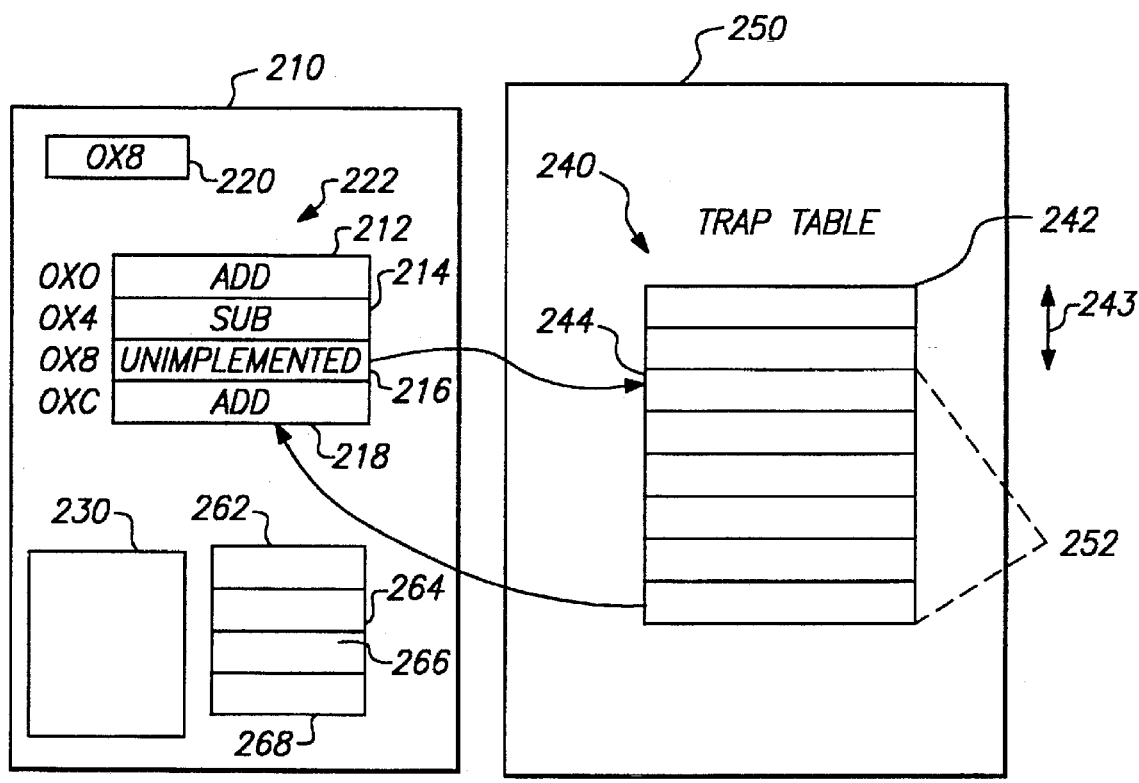
FIG. 2 is a schematic representation of a method for processing unimplemented instructions in accordance with the present invention.

Referring now to FIG. 2, there is shown a schematic representation of a system 200 for hardware-assisted software emulation of unimplemented instructions in accordance with the present invention. System 200 comprises a processor 210 and a memory 250 associated with processor 210 that includes an emulation code table 240. Processor 210 includes a PC 220, issue trap logic 230, and trap handling registers 262, 264, 266, 268. An instruction stream 222 is shown including implemented instructions 212, 214, 218 and unimplemented instruction 216.

Emulation code table 240, which may be formed by expanding trap table 140 (FIG. 1), comprises a base address 242 and a trap vector 244 corresponding to unimplemented instruction 216 at an offset 243 with respect to base address 242. Trap vector 244 forms the first step of an emulation code 252 tailored to the instruction type and parameter fields of unimplemented instruction 216, and is spaced sufficiently from other trap vectors (not shown) to accommodate all steps of emulation code 252.

Because emulation code 252 is tailored to the instruction type and parameter fields of unimplemented instruction 216, it does not include routines for retrieving and interpreting unimplemented instruction 216. Instead, emulation code 252 is coupled directly to unimplemented instruction 216 by offset 243, which is related to the instruction type and parameter fields of unimplemented instruction 216. When an exception is triggered, issue trap logic 230 reads instruction type and parameter fields in unimplemented instruction 216 to determine offset 243 and passes control directly to emulation code 252. Upon completion of emulation code 252, control of processing is returned to instruction 218 which follows unimplemented instruction 216.

The method for emulating unimplemented instructions will now be discussed with respect to the LDD and STD instructions defined in the SPARC architecture, versions 8 and 9, as discussed for example in D. L. Weaver, T. Germond, "The SPARC Architectural Manual", (1994) Prentice-Hall. The LDD and STD instructions are deprecated in version 9 but must be supported in some manner in order to run software written for version 8. It should be understood that a person skilled in the art will recognize that the method is generally applicable and is not restricted to the specific processor architecture and instruction types discussed below.

Figure 3:
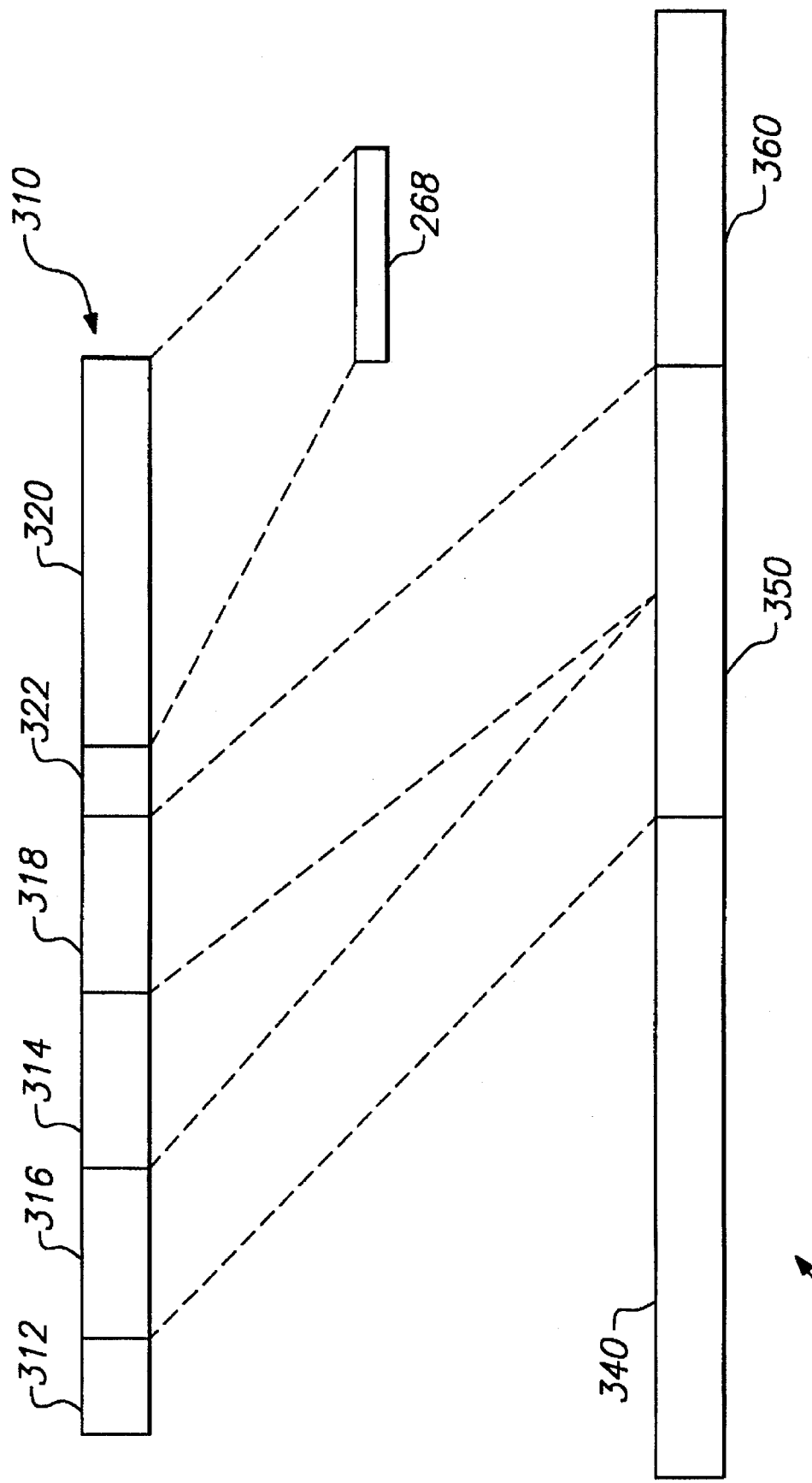
FIG. 3 is a schematic representation of the method for generating an address in the emulation code table from an unimplemented instruction.

Referring now to FIG. 3, there is shown an instruction code 310 in a format suitable for LDD (load double word) and STD (store double word) instructions. Instruction code 310 contains instruction type (opcode) fields 312, 314 and parameter fields 316, 318, 320. In the disclosed embodiment, parameter field 316 is a destination register field which indicates the register into which a value is to be loaded or from which a value is to be stored. Parameter fields 318, 320 are source register and immediate fields, respectively parameter fields 316, 318 are combined to indicate the memory address to be loaded or stored. An address bit 322 is set in LDD and STD instruction to indicate that the memory address to be loaded or stored is determined by the sum of parameter fields 318, 316, i.e. source register and destination fields, respectively.

Also shown in FIG. 3 is a 64 bit binary 330 that is generated by the method of the present invention to access emulation code 252 at trap vector 244. That is, binary 330 is the memory address at which emulation code 252 for the instruction type and parameter fields of unimplemented instruction 216 (FIG. 2) is accessed. Binary 330 comprises an emulation table base address field 340, an offset field 350, and a zero field 360. In the disclosed embodiment of the present invention, issue trap logic 230 of FIG. 2 retrieves a 48-bit base address 242 for emulation table 240 from TBA register 262 of processor 210 and writes base address 242 to base address field 340. Issue trap logic 230 retrieves parameter fields 316, 318 (destination and source register fields, respectively) from instruction code 310 and writes them to offset field 350, as indicated by dashed lines between instruction code 310 and binary 330. In the disclosed embodiment, parameter fields 316, 318 are 5-bit fields, with the upper 4-bits of parameter field 316 combined with the 5-bits of parameter field 318 to form offset 243 (FIG. 2). Issue trap logic 230 also retrieves immediate field 320 and writes it to a software accessible register 270 (FIG. 2) where it is available to emulation code 252 for processing unimplemented instruction 216. For example, in a SPARC based processor, software accessible register 270 may be provided by one of the ancillary state registers (% $ASR_{[r1]}$) supported in SPARC architecture. Additional bits not shown in FIG. 3 contribute to offset 243 and are discussed below in conjunction with issue trap logic 230.

Figure 4:
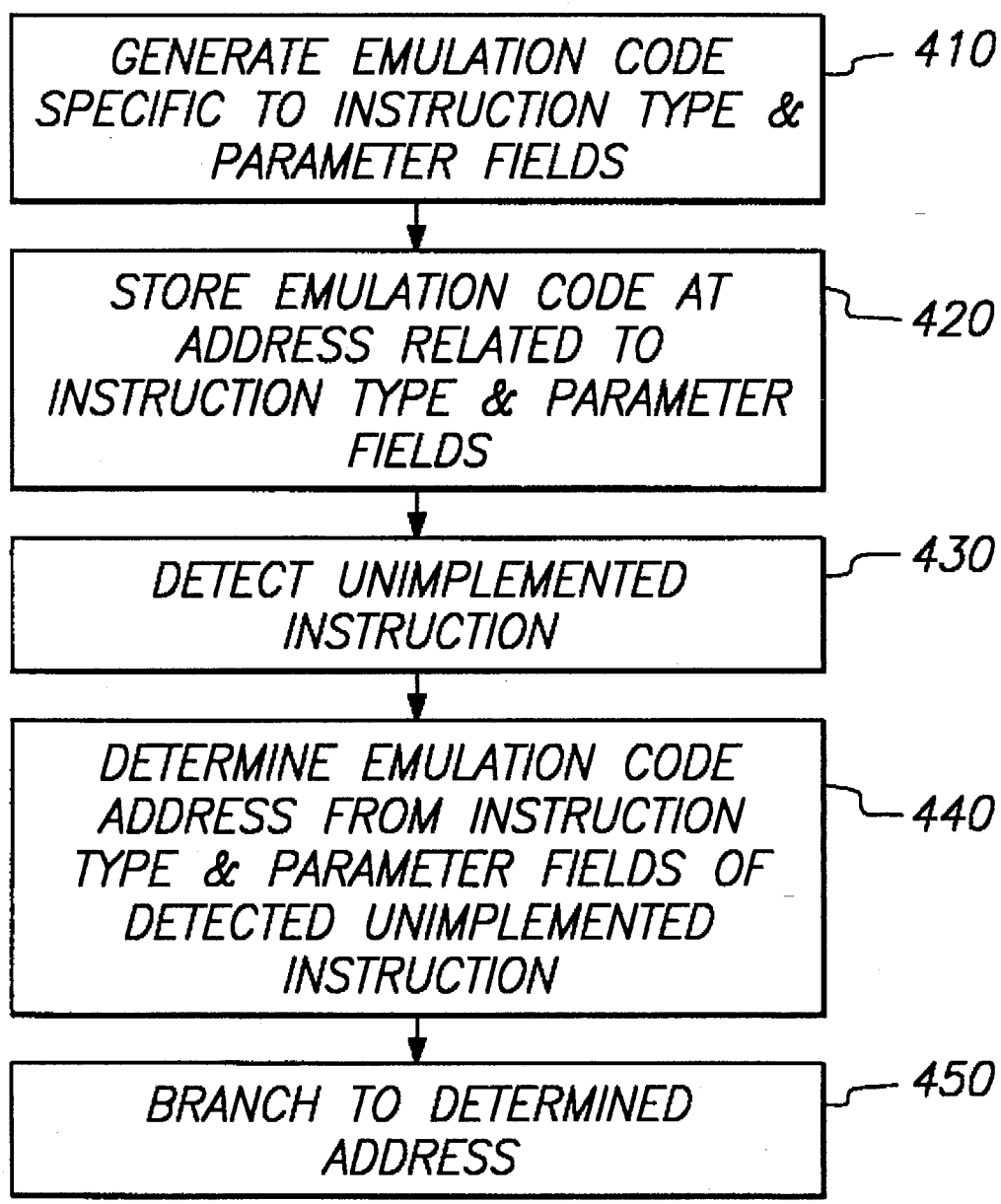
FIG. 4 is a flow chart of a method for software emulation of unimplemented instructions in accordance with the present invention.

Referring now to FIG. 4, there is shown a flow chart summarizing method 400 of the present invention. An emulation code specific to the instruction type fields and selected parameter fields of an unimplemented instruction is generated 410. The emulation code is then stored 420 at a memory address that is related to the instruction type and parameter fields of its corresponding unimplemented instruction. When an unimplemented instruction exception is detected 430, issue trap logic 230 (FIG. 2) determines 440 the memory address of the corresponding emulation code from the instruction type fields and selected parameter fields of the unimplemented instruction that triggered the exception. Method 400 then branches 450 to the determined memory address, transferring control to the emulation code that has been tailored to the unimplemented instruction as specified by its instruction type fields and selected parameter fields.

Figure 5:
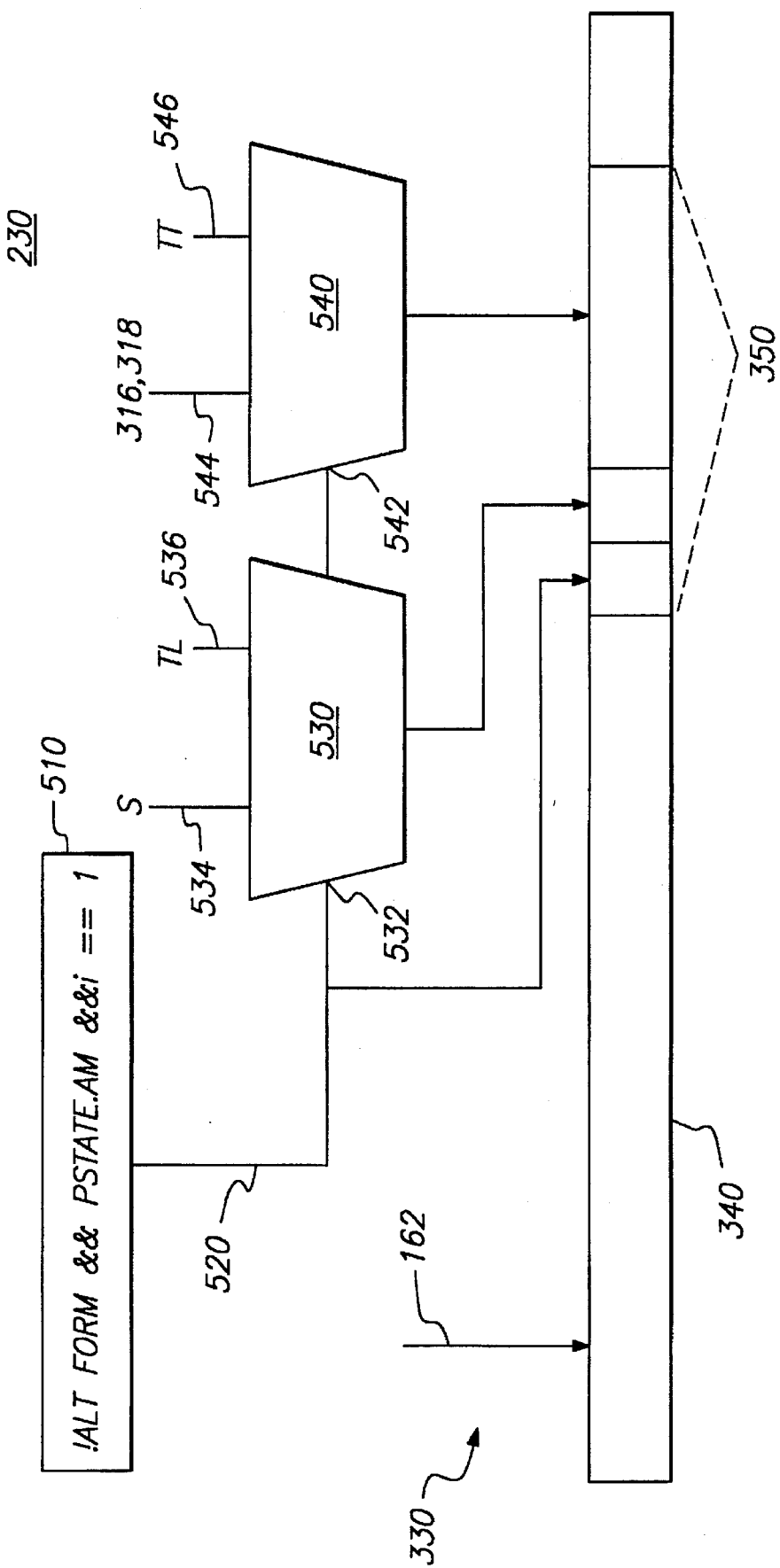
FIG. 5 is a schematic diagram of the logic used to generate the address of FIG. 3 from the fields of an unimplemented instruction.

Referring now to FIG. 5, there is shown a representation of issue trap logic 230 for implementing the emulation scheme of the present invention in the case of LDD and STD instructions defined in the SPARC Architecture. Logic unit 510 represents the logic gates necessary to identify LDD and STD instructions in processor 210 (FIG. 2). For example, LDD and STD instructions are 32 bit instructions having specific opcodes and employing immediate addressing mode. Accordingly, the address mask (AM) field of the PSTATE register in processor 210 is set (PSTATE.AM=1) to mask the upper 32 bits for processing, the i-field of LDD and STD instruction codes is set to indicate immediate addressing (i=1), and the opcodes. Finally, bit 23 (instruction type field) of instruction codes 310 distinguishes instructions LDD and STD from their alternate space counterparts LDDA and STDA, respectively. These three conditions are indicated schematically within logic unit 510.

A control line 520 from logic unit 510 sets bit 15 of binary 330 (FIG. 3) directly and sets bit 14 and bits 13-5 (corresponding to offset 243 of FIG. 2) through a pair of multiplexers 530, 540, respectively. As indicated earlier, the upper 48 bits of binary 330 are set directly by TBA register 162 and the lower 5 bits are zeroed.

In order to write offset 243 to bits 14-5 when an unimplemented instruction exception is triggered by an LDD or STD instruction, control line 520 is connected to select inputs 532, 542 of multiplexers 530, 540, respectively. A first data input 534 couples bit 21 (S) in the instruction type field of the LDD (S=0) and STD (S=1) instruction codes 310 to multiplexer 530, and second data input 536 couples TL register 164 of processor 210 to multiplexer 530. Similarly, a first data input 544 couples the sum of parameter fields 316 and 318 to multiplexer 540, and a second date input 546 couples TT register 166 to multiplexer 540. Control line 520 then couples inputs 534, 544 to bits 14-5 when set by logic unit 510 (LDD or STD detected) to form an offset 243 into emulation code table 240 pointing to emulation code 152, which is specific to parameter fields 316, 318 of LDD (STD) instructions. When control line 520 is reset by logic unit 510, inputs 536, 546 are coupled to bits 14-5 of binary 330, providing access to trap vectors for conventional exception handling.

Referring now to Table 1, there is shown an emulation code suitable for emulating LDD instructions specifying any source and destination registers and any immediate operand.

TABLE 1

| LDD: | | |
|---|---|---|
| | rd | % asr25, % g1 |
| | add | rs1, % g1, % g1 |
| | srl | % g1, 0, % g1 |
| | ldxa | [% g1]ASI_AS_IF_USER, rd + 1 |
| | sllx | rd + 1, 32, rd |
| | srl | rd + 1, 0, rd + 1 |
| | done | |
| | nop | |

Referring now to Table 2, there is shown an emulation code sequence suitable for emulating an STD instruction specifying any source and destination registers and any immediate operand.

TABLE 2

| STD: | | |
|---|---|---|
| | rd | % asr25, % g1 |
| | srl | rd + 1, 0, % g2 |
| | sllx | rd, 32, % g3 |
| | or | % g2, % g3, % g2 |
| | add | rs1, % g1, % g1 |
| | srl | % g1, 0, % g1 |
| | stxa | % g2, [% g1]ASI_AS_IF_USER |
| | done | |

Therefore, a system and method have been presented for using hardware to support fast software emulation of unimplemented instructions. Emulation codes, which form the software component of the invention, are tailored to the instruction type and parameter fields of the unimplemented instructions and stored at memory addresses determined from these fields. The resulting reduction in the size of the emulation code speeds up the software emulation process. The issue trap logic, which forms the hardware component of the invention, is expanded to read these fields when an exception is triggered to determine the memory address of the appropriate emulation code and branch directly to this emulation code.

What is claimed is:

1. A method for emulating an unimplemented instruction comprising the steps of:

generating a code sequence for emulating the unimplemented instruction which is specific to an instruction-type field, a source field, and a destination field of the unimplemented instruction;

forming an emulation code table having a base address in memory;

forming an offset from the base address with a parameter field of the unimplemented instruction;

storing the code sequence in the emulation code table at a memory address that comprises the combination of the base address and the offset;

when the unimplemented instruction is detected, determining the memory address of the code sequence from the instruction-type field, source field, and destination field;

storing an immediate field of the instruction code in a register accessible to the code sequence; and transferring control to the memory address of the code sequence in the emulation code table to emulate the unimplemented instruction.

2. The method of claim 1, wherein the step of forming the offset comprises adding a value in the source field of the instruction code to a value in the destination field in the instruction code.

3. A method for emulating an unimplemented instruction in a system comprising a processor, a memory coupled to the processor and indexed by memory addresses, and a code sequence stored in the memory that is suitable for emulating the unimplemented instruction, the method comprising the steps of:

determining a base address for an emulation code table;

combining the base address with an offset determined by an instruction-type field, a source field, and a destination field of the unimplemented instruction to form a memory address of the emulation code sequence;

storing the code sequence at the memory address;

when the unimplemented instruction is detected by the processor, retrieving the instruction-type, source, and destination fields to determine the memory address of the code sequence;

storing an immediate field of the instruction code in a register accessible to the code sequence; and transferring control to the code sequence at the determined memory address to emulate the unimplemented instruction.

4. A method for emulating an unimplemented instruction in a system comprising a processor, a memory coupled to the processor and indexed by memory addresses, and a code sequence stored in the memory that is suitable for emulating the unimplemented instruction, the method comprising the steps of:

storing the code sequence at a memory address that is related to an instruction-type field, a source field, and a destination field of the unimplemented instruction;

when the unimplemented instruction is detected by the processor, retrieving a base address for an emulation code table from a selected register in the processor;

determining an offset from the instruction-type, source, and destination fields of the detected instruction;

combining the offset and the base address to form the memory address of the code sequence;

storing an immediate field of the instruction code in a register accessible to the code sequence; and transferring control to the code sequence at the memory address to emulate the unimplemented instruction.

5. A method for emulating an unimplemented instruction in a system comprising a processor, a memory coupled to the processor and indexed by memory addresses, and a code sequence stored in the memory that is suitable for emulating the unimplemented instruction, the method comprising the steps of:

storing the code sequence at a memory address that is related to an instruction-type field, a source field, and a destination field of the unimplemented instruction;

when the unimplemented instruction is detected by the processor, retrieving the instruction-type, source, and destination fields to determine the memory address of the code sequence;

storing an immediate field of the instruction code in a register accessible to the code sequence;

passing control of the system to the code sequence;

accessing the immediate field value from the register as needed to emulate the unimplemented instruction; and returning control to an instruction following the unimplemented instruction in an instruction queue.

6. A system for implementing software emulation of an unimplemented instruction comprising:

a memory including an emulation code table having a code sequence at a selected address for emulating the unimplemented instruction, the code sequence being specific to an instruction-type field, a source field, and a destination field of the unimplemented instruction; and a processor including a first register for storing a base address for the code sequence, a second register accessible to the code sequence, and issue trap logic, the issue trap logic comprising:

means for detecting the unimplemented instruction;

means for reading the instruction-type field, source field, and destination field of the unimplemented instruction;

means for storing an immediate field of the unimplemented instruction in the second register;

means for determining the selected address of the code sequence from the read instruction-type, source, and destination fields; and means for transferring control of the processor to the code sequence stored in the emulation code table at the selected address.

* * * * *